H. KELLER.
MULTISTAGE CENTRIFUGAL PUMP.
APPLICATION FILED JAN. 23, 1907.
901,450.
Patented Oct. 20, 1908.
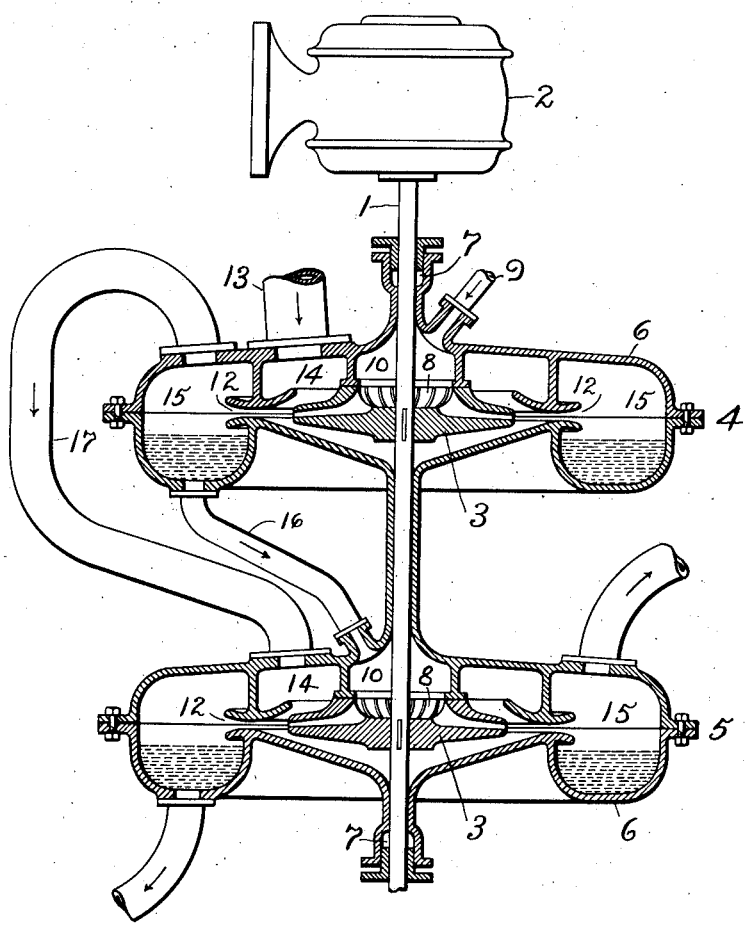
WITNESSES:
Lester H. Fulmer
J. Ellis Glen
INVENTOR
HULDREICH KELLER.
BY
ATTY.

UNITED STATES PATENT OFFICE.

HULDREICH KELLER, OF BERLIN, GERMANY, ASSIGNOR TO GENERAL ELECTRIC COMPANY, A CORPORATION OF NEW YORK.

MULTISTAGE CENTRIFUGAL PUMP.

No. 901,450.　　　　　Specification of Letters Patent.　　　　Patented Oct. 20, 1908.

Application filed January 23, 1907. Serial No. 353,616.

*To all whom it may concern:*

Be it known that I, HULDREICH KELLER, a citizen of Switzerland, residing at Berlin, Germany, have invented certain new and useful Improvements in Multistage Centrifugal Pumps, of which the following is a specification.

My invention relates to a device for pumping or conveying, and compressing or condensing fluids by means of a similar fluid or a denser fluid, designated hereafter as the active fluid, to which energy of velocity is imparted by a suitable rotary member. The active fluid flows or is conveyed in any suitable manner to the rotating member. Centrifugal action throws the fluid outward and in its outward flow it exerts an ejector effect upon the air, vapor or other medium in the space round the rotating member.

The object of my invention is to provide a device of the character described in which a high degree of compression or condensation is obtained in a series or succession of devices or stages and in which the active fluid may be used successively in the several stages, if desired. By the division of the total compression or condensation among several successive stages greater efficiency results and a high degree of compression or condensation is obtained which would be impossible of attainment if but a single stage were employed.

In the accompanying drawing showing an illustrative embodiment of my invention, a two-stage pump with a vertical shaft is delineated but it is to be understood that more than two stages may be employed if the operative conditions require them, and that the invention is not limited to a vertical arrangement of the parts.

For convenience in describing the structure and the operation of the device, it will be assumed that the active fluid is water and that the fluid acted upon is air, but obviously other fluids may be used. For example, air might be used to compress air, or water might be employed to condense exhaust steam from an engine or turbine. In the latter case, the condensed steam would add itself to the active fluid, viz., water in the stages of the apparatus. The vertical arrangement of the mechanism is particularly adapted for use with water because that liquid will then flow by gravity from one stage to the next.

In the pump illustrated, a shaft 1 driven by an electric motor 2, or other suitable driving means, has mounted upon it two impeller wheels 3, one in each stage 4 and 5 of the pump. A suitable thrust bearing is provided for the shaft. Surrounding each wheel is a casing 6 in which bearings are provided for the shaft 1 and leakage along the shaft is prevented by suitable stuffing boxes 7. Each impeller has a circular series of openings or passages 8 leading from a point adjacent the shaft to the periphery of the wheel and separated by partitions. The outlet of these passages is made smaller than the inlet in proportion to the increase in the velocity of discharge. Water from some suitable source flows through a pipe 9 into a chamber 10 formed by abutting annular projections upon the upper wheel and its casing. The water flows from the chamber 10 into the passages 8 in the impeller 3. The mass of water in these passages, rotating with the wheel, is thrown outward by centrifugal action and discharged across a gap into the converging entrance of an annular opening 12 formed in the casing. Air from any desired source, such as a condenser, entering the casing through the pipe 13 fills the space 14 within the casing and surrounding the wheel 3 and the walls of the chamber 10. As the body of liquid is delivered with considerable velocity into the opening 12 it, by a sort of ejector action, draws or picks up air in the gap connected with the space 14, and air and water are discharged from the opening 12 into the annular chamber 15 forming the outer portion of the casing 4. The water gravitates to the lower portion of the chamber and may be conveyed by a pipe 16 to the second stage of the pump. A pipe 17 conducts air from the upper portion of the chamber to the space 14 of the second stage. The general structure and operation of the second and subsequent stages is the same as that of the first stage, but the parts of the several stages are not necessarily of the same dimensions. From the last stage, the water and air are conveyed by suitable conduits to any desired receptacles where the water may be collected for repeated use or permitted to flow freely away.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In a device of the character described having a series of pumps or stages, the combination of a conduit supplying active fluid to the first pump or stage, a conduit supplying a less dense fluid to said stage to be compressed or condensed by the active fluid, means for passing said active fluid from one stage to the next, means for conducting the fluid acted upon from each stage to the next so that the less dense fluid is successively acted upon by the same body of active fluid, and means for driving the device.

2. A device of the character described having a series of pumps or stages, means for passing the active fluid through the several stages in succession, means for conducting the fluid acted upon from each stage to the next, and means for driving the device.

3. In combination, a shaft, a series of impellers mounted on the shaft, casings for the impellers, devices for supplying active fluid to the impellers to pass through them in succession, chambers in the casings adjacent the impellers for the fluid acted upon, means connecting said chambers in successive order, and means for rotating the shaft and impellers.

4. A pump having a series of stages and a shaft common to the several stages, each stage comprising an impeller mounted on the shaft, and a chambered casing inclosing the impeller, means for supplying the first stage with active fluid and the fluid to be acted upon, devices for conveying the fluids separately from each stage to the next succeeding stage to permit the successive use of the active fluid in the several stages and a step-by-step compression or condensation therein of the fluid acted upon, and means for driving the shaft and impellers.

5. In combination, a shaft, impeller wheels mounted on the shaft, a casing for each wheel, separate supply chambers in each casing for the active fluid and the fluid to be acted upon, a chamber in each casing receiving the discharge from the wheel and having receptacles in which the two fluids separately collect, means for causing the active fluid to exert an ejector effect upon the other fluid as said active fluid is discharged from the impeller wheel into the receiving chamber, conduits connecting the active fluid receptacle of each casing with the corresponding supply chamber of the next casing so that said fluid is successively employed in the several stages, and conduits connecting the second receptacle of each casing with the corresponding supply chamber of the next casing to effect a step-by-step compression or condensation of fluid acted upon.

6. In an apparatus of the character described, the combination of a plurality of pumps or stages arranged in series, each pump or stage having an impeller and a receiving device separated by a gap through which the liquid passes on its way through the apparatus, means for supplying gas and causing it to be picked up and successively compressed in the several stages by the moving column of liquid as it flows through the several gaps in series, and means for carrying off the liquid and gas after they pass to the last receiving device.

7. In an apparatus of the character described, the combination with a plurality of pumps or stages, each stage including a casing, an impeller within the casing, a chamber in the casing separated from the impeller by a gap and receiving the liquid discharged through the gap by said impeller, a conduit supplying liquid to the impeller, and means causing the gas acted upon to be picked up and delivered to said chamber by the liquid as it is discharged through the gap, of means for conveying the liquid from the chamber of one stage to the impeller of the next stage to be used successively in the several stages, means for conveying the gas received by the chamber of one stage to the gap between the impeller and corresponding chamber of the next stage to thereby compress it successively in the several stages, and discharge conduits for the liquid and the compressed gas.

In witness whereof, I have hereunto set my hand this 5th day of January, 1907.

HULDREICH KELLER.

Witnesses:
MARTIN KRAUSS,
HANS REINECKE.